April 8, 1969  A. L. GOOD  3,436,985
ARM CONSTRUCTION FOR A PRESSURE REGULATOR AND THE LIKE
Filed Dec. 20, 1966  Sheet 3 of 5
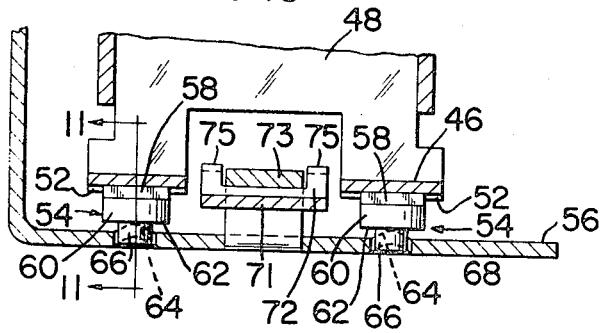
FIG-10
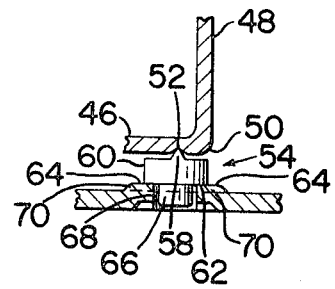
FIG-11
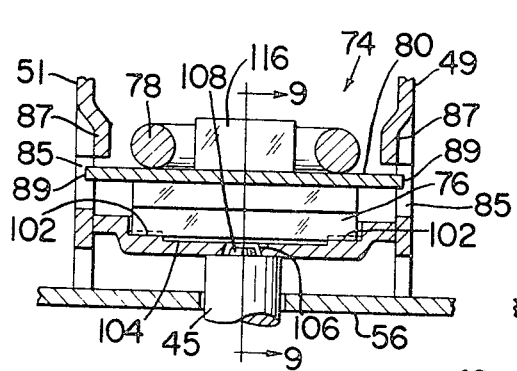
FIG-12
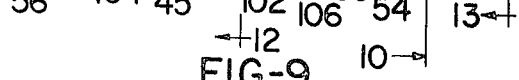
FIG-9
FIG-14
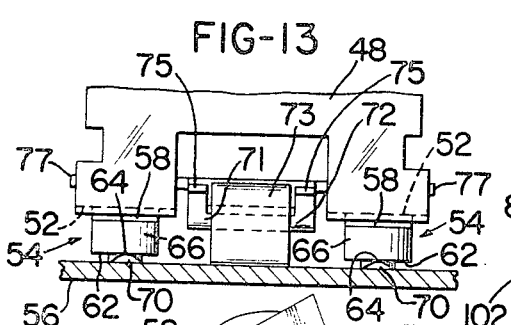
FIG-13
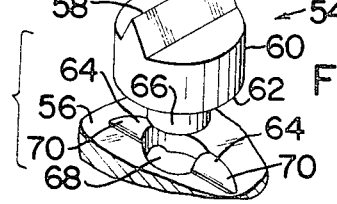
FIG-15
FIG-16
INVENTOR.
ARTHUR L. GOOD
BY
Caudor & Caudor
HIS ATTORNEYS

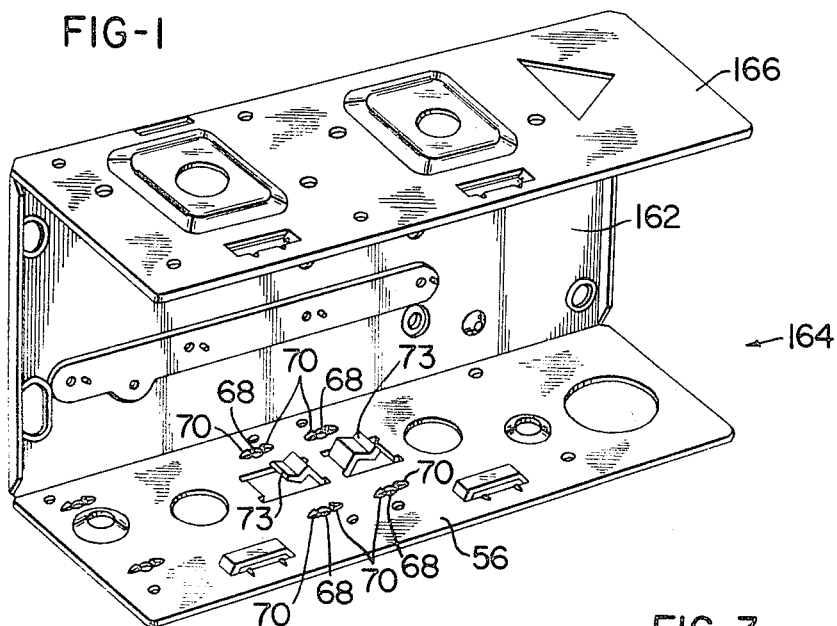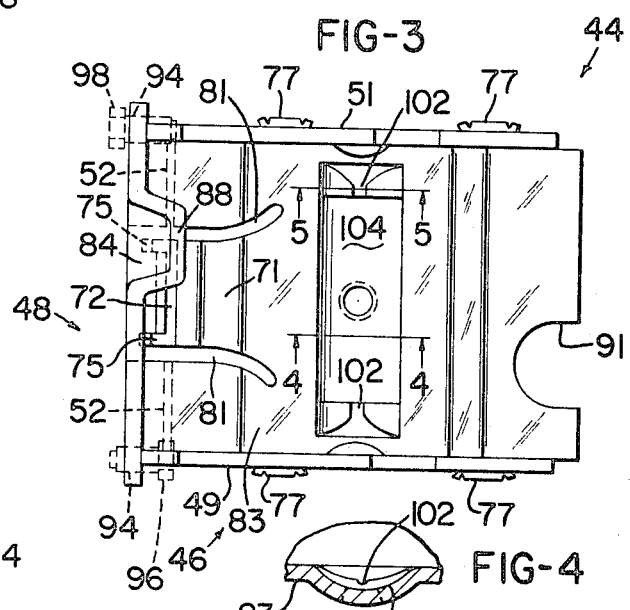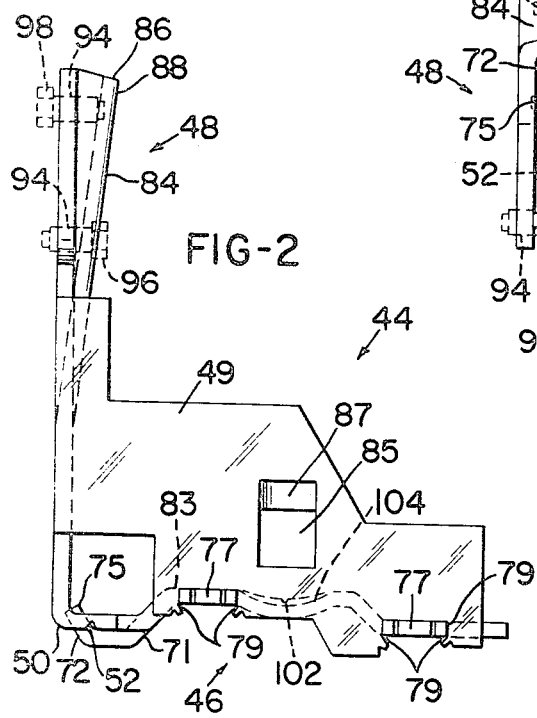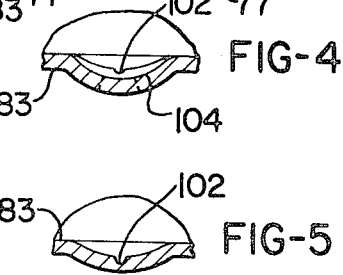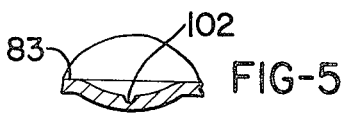

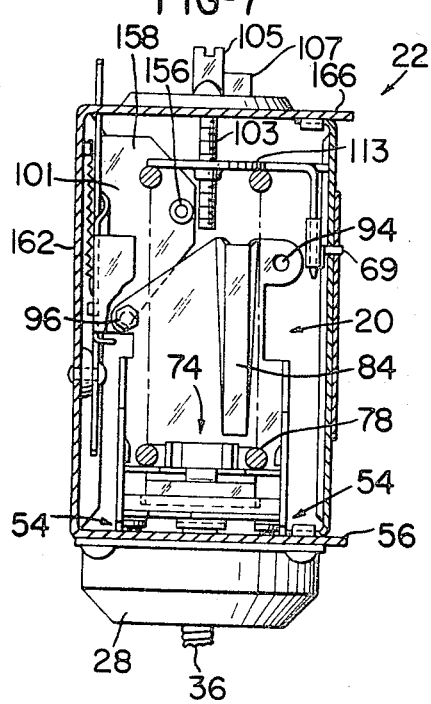
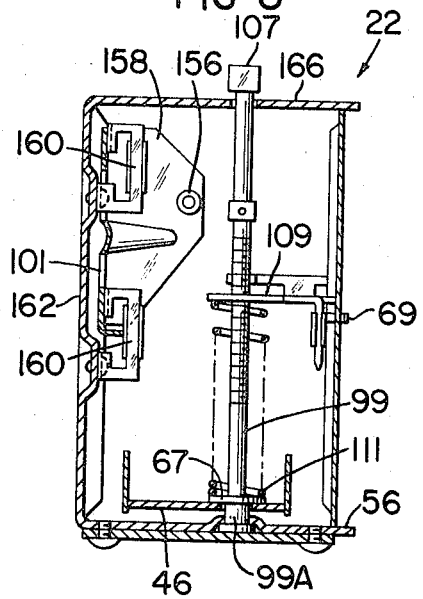
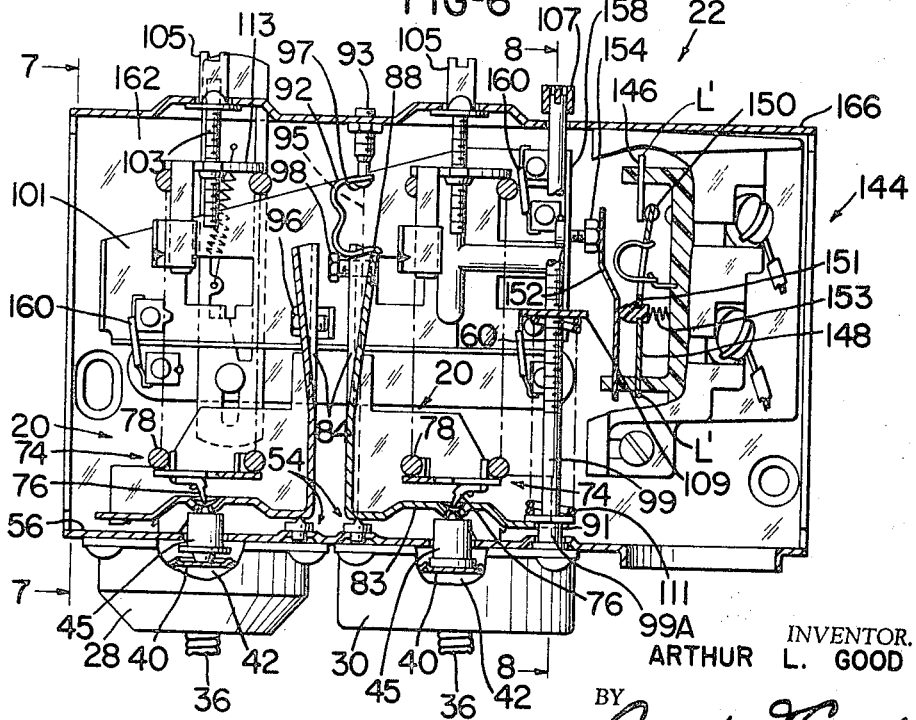

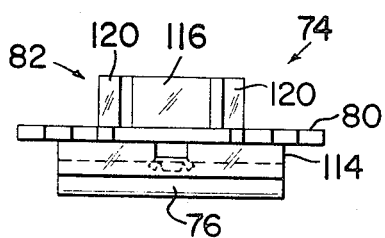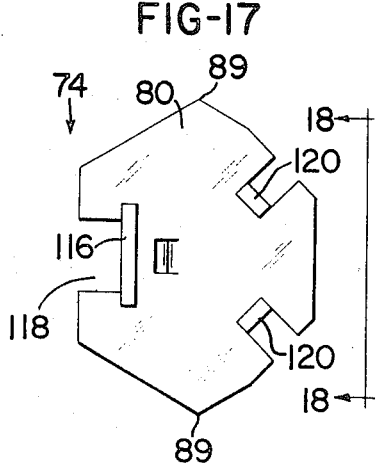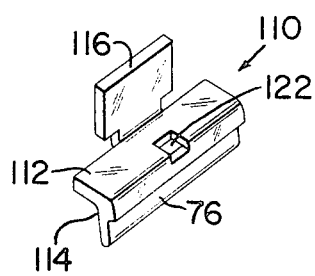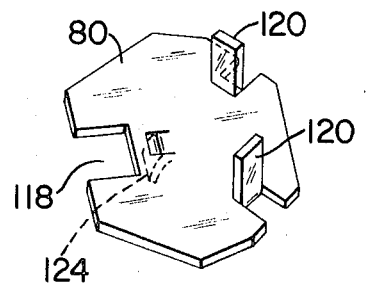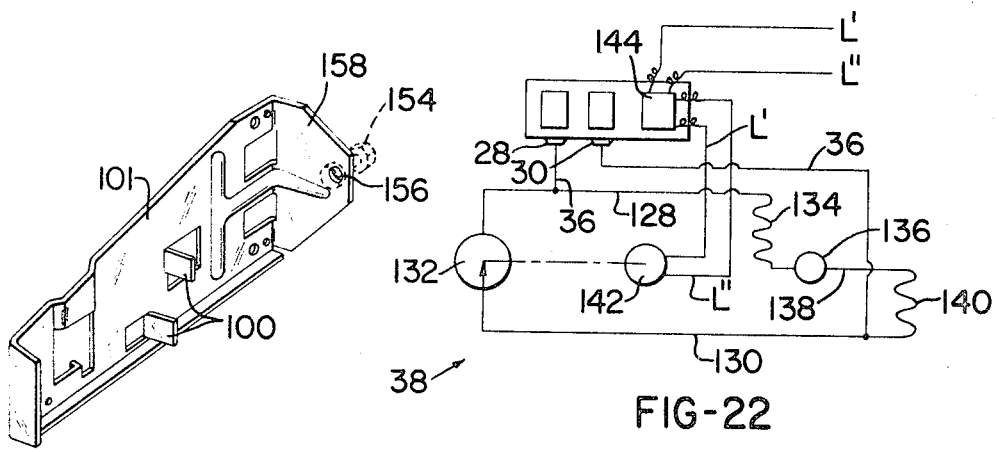

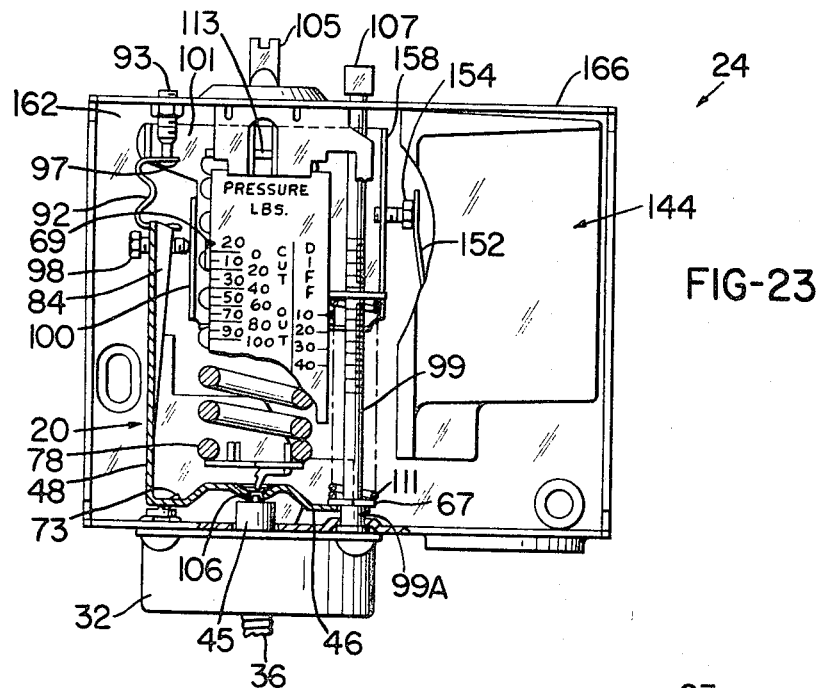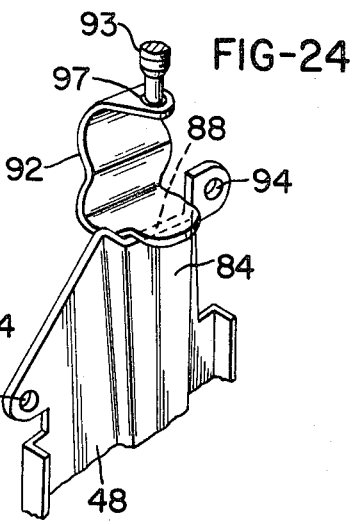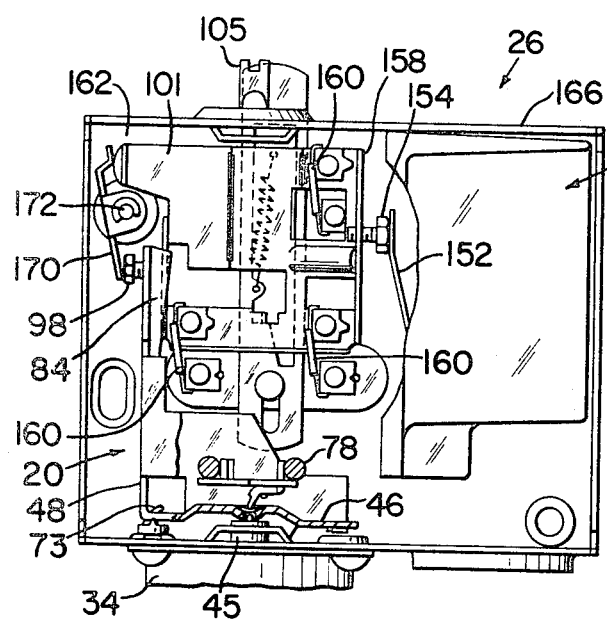

United States Patent Office 3,436,985
Patented Apr. 8, 1969

3,436,985
ARM CONSTRUCTION FOR A PRESSURE
REGULATOR AND THE LIKE
Arthur L. Good, Elkhart, Ind., assignor to Robertshaw
Controls Company, Richmond, Va., a corporation of
Delaware
Filed Dec. 20, 1966, Ser. No. 603,195
Int. Cl. G05g 1/04
U.S. Cl. 74—559                                21 Claims

ABSTRACT OF THE DISCLOSURE

This application discloses an arm construction for a pressure regulator and the like having a horizontal arm lever and a vertical lever rigidly secured together at a rigid arm lever junction. An arm fulcrum groove is adjacent said junction. A universal frame fulcrum means includes a rockable plate with a plate ridge on the upper side and a flat underside. The frame has a ridge construction at right angles to said plate ridge to produce the universal action. The arm construction may be formed from a single blank by bending processes.

SUMMARY OF THE INVENTION

This invention relates to an arm construction for a pressure regulator and the like.

An arm construction of this invention may include a substantially L-shaped rocker arm having a substantially horizontal arm lever and a substantially vertical arm lever rigidly secured together at a rigid arm lever junction means.

Such arm construction means may also include arm fulcrum means on such arm construction adjacent the lever junction means.

The arm construction also may include frame fulcrum means to be supported on a frame and the like, and rockingly engaging the above arm fulcrum means.

These parts of the arm construction of this invention cooperate to provide an arm construction that may be assembled on a frame and the like in a versatile manner accurately to receive actuation from a pressure and/or temperature responsive member, and accurately to transmit such actuation to a regulating means that controls the operation of a pressure and/or temperature modifying device.

The arm construction of this invention also may be assembled with one or more other arm constructions of this invention on a frame and the like jointly to cooperate to provide a large number of different embodiments, each embodiment of which may be assembled in an economical manner, either as an individually tailored controller or as a quantity production item.

The arm construction of this invention also may include a universally mounted fulcrum construction that maintains accurate operation, and prevents undesired strains and stresses in the controllers which are provided with the arm construction or constructions of this invention.

Other features and advantages of this invention are apparent from this description, the appended claimed subject matter, and/or the accompanying drawings, in which:

FIGURE 1 is a perspective view of a frame construction for a pressure regulator which is provided with an arm construction of this invention.

FIGURE 2 is a side view of an L-shaped rocker arm forming part of the arm construction of this invention.

FIGURE 3 is a top view of FIGURE 1.

FIGURE 4 is a cross section along line 4—4 of FIGURE 3.

FIGURE 5 is a cross section along the line 5—5 of FIGURE 3.

FIGURE 6 is a diagrammatic vertical cross section of a pressure regulator assembled in the frame of FIGURE 1, and including a plurality of rocker arms of the character shown in FIGURES 2–5.

FIGURE 7 is a diagrammatical vertical cross section substantially along the line 7—7 of FIGURE 6.

FIGURE 8 is a diagrammatical vertical cross section substantially along the line 8—8 of FIGURE 6.

FIGURE 9 is an enlarged cross section of a portion of the left arm construction of FIGURE 6.

FIGURE 10 is a cross section taken along the line 10—10 of FIGURE 9.

FIGURE 11 is a cross section along the line 11—11 of FIGURE 10.

FIGURE 12 is a cross section along the line 12—12 of FIGURE 9.

FIGURE 13 is a cross section along the line 13—13 of FIGURE 9.

FIGURE 14 is a cross section of a portion of the rocker arm taken along a plane farther away than the plane of FIGURE 9.

FIGURE 15 is an exploded perspective view of one of the upward fulcrum ridge means and frame ridge means used in the arm construction of this invention.

FIGURE 16 is a perspective view of the rocker arm shown in FIGURES 2–5.

FIGURE 17 is a top view of the spring end receiving means used on the upper surface of the horizontal arm lever.

FIGURE 18 is a side elevation taken from the line 18—18 of FIGURE 17.

FIGURE 19 is the perspective view of the plate member portion of FIGURES 17 and 18.

FIGURE 20 is the perspective view of the zig-zag sheet metal member used with the plate member of FIGURE 19 to form the spring end receiving means shown in FIGURES 17 and 18.

FIGURE 21 is a perspective view of the shuttle member shown in FIGURES 6–8.

FIGURE 22 is a diagrammatic view of a refrigeration system to which the pressure regulator of this invention may be connected.

FIGURE 23 is a front view, partly in cross section, of a pressure regulator to control the cut out pressure of the low pressure side of a refrigeration system and the like.

FIGURE 24 is an enlarged perspective view of a negating spring to be used with the arm construction of this invention, such as shown in FIGURES 6 and 23.

FIGURE 25 is a view of a controller somewhat similar to FIGURE 23, but showing the use of a reversing lever construction instead of the negating construction shown in FIGURE 23.

Certain words may be used in the specification and/or claimed subject matter indicating direction, relative position, and the like. These words are used for the sake of clearness and brevity. However, it is to be understood that they are used in connection with the illustrations in the drawings, and that in actual use the parts so described may have entirely different direction, relative position, and the like. Examples of these words are "vertical," "horizontal," "upper," "lower," and the like.

The arm construction 20, of this invention, is adaptable for use in various positions and to produce various functions in a variety of pressure regulators.

Two arm constructions 20 are used, for example, in the pressure regulator 22 of FIGURES 6, 7, and 8. Only one arm construction is used in each of the pressure regulators 24 and 26 of FIGURES 23 and 25 respectively. These FIGURES 6, 7, 8, 24 and 26 show examples of the particular positions and functions of the arm constructions 20 for which the arm constructions may be used. However, it is to be understood that arm constructions 20 of this invention may be used in many other pressure regulators, in other positions, and to perform other functions, than the particular ones herein disclosed.

In FIGURES 6, 7 and 8 the two arm constructions 20 may be respectively actuated by the pressure and/or temperature responsive members 28 and 30 respectively. In FIGURE 23, the arm construction 20 may be actuated by the pressure and/or temperature responsive member 32. In FIGURE 25, the arm construction 20 may be actuated by the pressure and/or temperature responsive member 34. These members 28, 30, 32, and 34 may be made responsive to pressure and/or temperature by any well known construction, such as a bellows construction inside these members, which may be connected by suitable fluid pressure conducting conduits 36 to any pressure or temperature chamber, conduit, or any other member, the pressure and/or temperature of which is to be regulated by the pressure regulator of the character illustrated. In making these pressure regulators responsive to temperatures, the conduit or conduits 36 may be connected to suitable temperature responsive bulb constructions, not shown, which may contain a thermostatically responsive fluid, the pressure of which is transferred by the conduits 36 to the members 28, 30, 32 and 34 in a well known manner. The conduits 36 may also be connected to other conduits, chambers, and the like, which in turn are responsive to fluid pressures in various devices or systems, and these fluid pressures themselves may be responsive to temperature created in such devices or systems, which may be controlled or regulated by regulators using the arm constructions of this invention. For example, the conduits 36 may be connected to various parts of the refrigeration system 38 of FIGURE 22, elsewhere described. The conduits 36 may be connected to various conduits or chambers of the refrigeration system, or to temperature responsive bulbs, which may be made responsive to temperatures created by various parts of the refrigeration system, as desired.

The members 28, 30, 32 and 34 may contain upwardly and downwardly expandable and contractible bellows members 40 which have bellows cavities 42, which may be connected to the conduits 36. The upper walls of the bellows 40 operate upwardly and downwardly movable actuators 45 which operate, or actuate the arm constructions 20 of this invention.

The arm constructions 20 of this invention may include an L-shaped rocker arm 44, FIGURES 3, and 16, having a substantially horizontal arm lever 46 and a substantially vertical arm lever 48. These arm levers 46 and 48 may be rigidly secured together at a rigid arm lever junction 50. The levers 46 and 48 may also be connected together by the arm side walls 49 and 51. The arm levers 46 and 48, the arm side walls 49 and 51, and the lever junction 50 may all be part of an integral or homogeneous sheet construction, and made from a single metal sheet, if desired, such as indicated in FIGURE 16, and further described elsewhere.

Arm fulcrum means 52 may be provided on the arm construction 20, such as is shown in FIGURES 2, 10, 11 and 13. Such arm fulcrum means 52 may be adjacent the lever junction 50. Such arm fulcrum means may be in the form of a groove means 52 on the under side of the horizontal arm lever 46, adjacent to the junction 50.

Frame fulcrum means 54, FIGURES 9–13 and 15 may be supported on a frame 56. This frame fulcrum means 54 rockingly engages the arm fulcrum means 52. The frame fulcrum means 54 may include a fulcrum ridge or fulcrum ridge means 58 rockingly receiving the groove means 52.

The groove means 52 and the frame fulcrum means 54 may provide a universally mounted fulcrum means for the rocker arm 44.

The frame fulcrum means 54, FIGURES 9–13 and 15, may include a fulcrum plate means 60 which carries the plate fulcrum ridge means 58 on the upper side of the plate means 60. The plate means also has an underside outer flat portion 62 to rock on frame ridges or frame ridge means 64. The frame ridge means 64 is at right angles to the plate fulcrum ridge means 58, as shown in FIGURE 15, to provide a universal rocking action between the frame 56 and the rocker arm 44. The fulcrum plate means 60 also has a central downward button or shaft 66 extending downwardly into a frame opening 68. The opening 68 divides the frame ridge means 64 into two separate frame ridges 70, 70, shown on opposite sides of an opening 68 in FIGURES 1 and 15. The ridges 70 may be formed by upwardly striking the frame plate 56 at the required number of places to produce as many of the frame fulcrum ridges 70, 70, as desired.

Each arm construction 20 may have two fulcrum plate means 60 respectively near each side of the rocker arm 44 with a separate plate fulcrum ridge means 58 on the upper side of each of the plate means 60 to engage two spaced groove means 52, 52, FIGURES 10 and 13 on the underside of the horizontal arm lever 46. Each of the two fulcrum plate means 60 has an underside outer flat portion 62 for rocking on two separate frame ridge means 70, 70 and 70, 70, FIGURE 1, at right angle to said fulcrum ridge means 58. Each of the two fulcrum plate means 60 also has a central downward button or shaft 66 extending into the respective frame openings 68, 68, of FIGURE 1.

FEATURES OF ROCKER ARM 44

The rocker arm 44, or rocker arm construction, is shown in perspective in FIGURE 16, in side view in FIGURE 2, and in top view in FIGURE 3. It may be formed from a single blank by bending processes, as is obvious from FIGURE 16. It has a horizontal arm lever 46 having opposite sides and ends, a vertical arm lever 48 having opposite sides and ends, and has an elbow joint construction or arm lever junction means 50, homogeneously joining adjacent ends of said horizontal arm lever 46 and the vertical arm lever 48. A pair of sides or side braces 49 and 51 are respectively joined to opposite sides of said arm levers and are integral or homogeneous with the vertical arm lever 48. The braces 49 and 51 are rigidly secured to the horizontal arm lever 46 by means of the tongues 77, FIGURES 16 and 2 which are staked or welded securely in the notches 79 in the side braces 49 and 51.

The upper end of the vertical lever 48, FIGURE 16, has screw receiving holes 94 for the selective reception of screws 96 and 98 which may be any of the adjustable screws shown to engage any of the abutment flanges 100 of the shuttle members 101 shown in FIGURES 6–8, 23 and 25.

The vertical arm 48 has a slanting vertical channel 84, the top end 88 and edge 86 of which is adapted to be the lower fulcrum point for the negating spring 92, in FIGURES 6, 23 and 24. The top edge 86 is properly rounded or otherwise finished properly to rock the lower end of the negating spring 92, FIGURES 6, 23 and 24.

The horizontal lever 46, FIGURES 3, 9 and 16, has a downwardly slanting tongue 71 which is formed between the slits 81. The tongue 71 interlocks with a fulcrum hook 73, FIGURES 1 and 9, which is formed in the frame 56 at the proper place properly to locate the arm 44. The fulcrum hook 73 engages the upwardly bent free end 72 of the tongue 71, so that the horizontal lever 46 can fulcrum or pivot under the hook 73. A pair of small lugs or ears 75, FIGURES 2, 3, 9 and 16, engage the sides of the fulcrum hook 73, and prevent sidewise movement of the arm 44, as it rocks under the hook 73.

The horizontal lever 46 has a raised platform 83, FIGURES 3, 9 and 16, in which a rocker groove 104 is formed to receive a downward rocker lip 76, FIGURE 9, of a spring end receiver 74 to be more fully described. The groove 104 is more deeply curved in its central part, FIGURES 3, 4 and 5, and has shallower relatively sharp bottomed rocker groove means 102 at its ends which receive the ends of the downward lip 76, to transfer a relatively sharp equally distant spring stress on the horizontal arm 46.

The end of the horizontal lever 46, FIGURES 3 and 16, has a notch 91 to permit a rod 99, FIGURE 6, to pass through the lever 46 without interfering with the movement of the lever 46.

The negating spring 92 of FIGURES 6, 23 and 24 has its upper end fulcrumed on the lower end of a vertically adjustable screw threaded pin 93. The pin 93 is pivoted in an indented portion 97 on the upper end of the negating spring 92, so that the negating spring 92 may rock about the fulcrum 93 as the vertical arm lever 48 moves rightwardly from the dotted line 95 in FIGURE 6, which extends from the lower end of the screw 93 to the respective ridge member constructions 58 above the pressure member 30. The operation of the negating spring 92 is such that it reduces the spring rate of the compression spring 78 so that a fixed on and off switch action can be obtained with an operating force at the bellows 40 less than that which would be required without the negating spring 92. The reducing force of the spring 92 is in proportion substantially to the sine of the angle of the line of the negating spring fulcrums 97 and 88 with the line 95, FIGURE 6, which joins the arm fulcrum 54 and upper negating spring fulcrum 97.

The horizontal arm lever 46 has a spring end receiver 74 with a rocker means or lip 76, as shown in enlarged scale in FIGURES 9, 12, 17 and 18. The spring end receiver 74 may receive any one of the various compression coil springs 78 shown in FIGURES 6, 7, 23 and 25.

The spring end receiver 74 is a substantially horizontal rockable plate 80 with the downward fulcrum member or lip 76 engaging the top side of the horizontal arm lever 46. The horizontal plate 80 has upward spring receiving flange means 82 to hold the end of the compression spring 78 against horizontal displacement.

The downward lip 76 rocking means, hook or tongue means engages the rocker groove 102, FIGURES 3–5, on the top side of the horizontal arm lever 46. The downward tongue means or lip 76 may be a relatively long straight tongue, FIGURES 18 and 20, the ends of which engage the end grooves 102, 102 at the end of the long deeper channel 104 on the upper surface of the horizontal lever 46.

The long relatively deep channel 104 is on the upper surface of the horizontal lever 46. Such long channel 104 may have an opening 106 to receive the nipple 108 of the actuator 44.

The flat tongue means 76 may be the lower part of a zigzag sheet metal member 110, FIGURE 20, which has a central attaching part 112 attached to the lower part of the plate 80, FIGURE 19, and a downwardly directed part 114 which carries the tongue 76 to form the rocking edge of the spring receiver 74.

The upward flange means 82, FIGURE 18, may include an upwardly directed flange 116, FIGURES 17 and 20, of the zigzag member 110, which extends upwardly through an opening 118 in the edge of plate 80, FIGURES 17 and 19. The upward flange means 82 may also include flanges 120 which are cut and bent upwardly from the edge of the plate 80. The central attaching part 112 of zigzag member 110, FIGURE 20, has an opening 122, which receives a downward tongue 124, FIGURE 19, of the plate 80. The tongue 124 may enter the opening 122, FIGURE 20, and thereafter the tongue 124 may be staked at 126 as shown in FIGURE 9. If desired, the central attaching part 112 may be welded or otherwise secured to the under side of the plate 80.

A pair of openings 85, FIGURES 2, 9, 12 and 16, may be formed in the side braces 49 and 51, and inwardly directed bridges 87 may be struck in the braces 49 and 51.

The openings 85 may receive the ends 89 of the plate 80, FIGURE 17. The bridges 87 limit the upward movement of the plate 80 to prevent the tongue 76 from raising out too far of the grooves 102 when the range settings are reduced beyond their designed limits.

The upper ends of the compression springs 78 are adjusted by rotation of the adjusting screws 103 which have square stems at their upper ends to receive adjusting knobs or levers, not shown.

Turning of the screws 103 adjusts the spring load of the compression springs 78. The upper ends of the springs 78 are received by adjusting internally threaded plates 113, which engage the screws 103. The plates 113 are vertically adjusted by the adjustment turning of the screws 103. The plates 113 are prevented from turning by the pointer constructions 69, FIGURES 6 and 7. In this manner the downward pressure of the coil springs 78 on the arm constructions 20 are calibrated to make the rocking movement of such arm constructions 20 properly responsive to the pressures in the bellows 40.

A differential compression coil spring 111 surrounds the adjusting threaded rod 99. The upper end of the spring 111 engages the internally threaded plate 109, which can be vertically adjusted by rotation of the rod 99 by the square adjusting stem 107 which also may have an adjusting knob or lever, not shown. The plate 109 is prevented from turning by pointer construction 69.

The lower end of the differential spring 111 engages a lower loose washer 67 which presses down on the right horizontal lever 46. The rod 99 passes through the notch 91, FIGURES 3 and 16, but the lower loose washer 67 under differential spring 109, FIGURE 6, is larger than the notch 91, so that the washer presses down on the horizontal lever 46 of the right arm construction 20 of FIGURE 6.

The rod 99 has a larger diameter end portion 99A the shoulder of which arrests the downward motion of washer 67 and prevents the differential spring from following the downward movement of lever 46. The differential spring 111 therefore does not determine the "cut out" pressure of the low side. It determines only the "cut in" pressure. Adjustment of screw 98, FIGURE 8, can cause the lever 46 in combination with negating spring 92 and compression spring 78 to determine the "cut out" pressure and the lever 46, compression spring 78, negating spring 92 and differential spring 111 to determine the "cut in" pressure.

The differential spring 111 determines the difference in "cut in" and "cut out" pressures of the snap switch 144, by adjustment of the upper plate 109 by the turning of threaded rod 99, to determine the "cut in" pressure.

The pressure or temperature regulator shown in FIGURES 6, 7 and 8 uses two arm constructions 20. These two arm constructions 20 are actuated by the pressure or temperature responsive members 28 and 30 which may be respectively connected, by the conduits 36, to the conduits 128 and 130 of the refrigerating system 38 of FIGURE 22.

The refrigerating system may be of any usual type. For example, the refrigeration conduit 128 may be a high pressure conduit which connects refrigerant compressor 132 to the refrigerant condenser 134. The refrigerant from condenser 134 may pass through a refrigerant expansion valve 136, which discharges the expanded refrigerant into a refrigerant line 138 and to a refrigerant evaporator 140. The refrigerant evaporator 140 is connected by the low pressure refrigerant conduit 130 in the intake of the compressor 132.

The compressor 132 may be driven by an electric motor 142 which may be started and stopped by the switch 144. The switch 144 may be a snap switch which opens and closes one or both of the electric lines L′ and L″.

In FIGURE 6, the well known snap switch 144 is shown as a single pole snap switch which opens and closes the line L' only. However, the snap switch 144 may be a double pole snap switch, of well known construction, which may open both of the lines L' and L'' in FIGURE 22. The line L' of FIGURE 22 may be connected to the stationary contact 146 of FIGURE 6 and such line L' may continue through the closed switch 144 and through the lower end of a snap blade 148 to the motor 142 of FIGURE 12.

The snap blade 148 has a movable contact 150 which is snapped into and out of contact with the stationary contact 146 during rightward and leftward movement of the actuator blade 152.

The actuator blade 152 may be relatively stiff, if desired, and may be moved rightwardly and leftwardly in accordance with refrigerant pressures, as more fully elsewhere described. The blade 152 moves the insulative button 151 against the resistance of the small compression spring 153 and snaps the blade 148 under the snap action of the well known C spring. The actuating blade 152 may be moved rightwardly and leftwardly by the abutting screw 154 which may be threadedly carried by the opening 156 in the end flange 158 of the shuttle member 101, FIGURES 6 and 21. The shuttle member 101 is carried by leftwardly biased spring supports 160 which are attached to the shuttle member 101, and to the vertical rear wall 162, FIGURE 1, of U-shaped frame construction 164, which also has the lower frame wall 56, and the upper horizontal frame wall 166.

The arm constructions 20, FIGURE 6, are mounted on the lower horizontal frame wall 56 and are rocked about their respective fulcrum constructions by the actions of the bellows 40 within the chambers 28 and 30. When the refrigerant pressure in the high pressure line 128, FIGURE 22, reaches an upward desired or safe limit, the left bellows 40, FIGURE 6, in the chamber 28 rocks the left arm construction 20 clockwise and causes the screw 96 to engage a flange 100, FIGURE 21, to move the shuttle 101 rightwardly. This causes the screw 154 to push the actuating switch blade 152 rightwardly and causes the snap blade 148 to be snapped rightwardly away from the stationary contact 146 by the snap C spring to open the line L' at the movable contact 150. This stops the motor 142 and stops the refrigerant cycle until such time as the refrigerant pressure in refrigerant line 128 falls below the selected high pressure limit a sufficient amount to cause the actuating blade 152 to be moved leftwardly a sufficient amount to cause the snap blade 148 to snap leftwardly and close the contact 150 on the stationary contact 146. This energizes the motor 142 and again causes the compressor 132 to operate.

However, the snap switch 144 is also under the control of the pressure or temperature responsive member 30 which is connected by its respective connecting line 36 with the low pressure refrigerant line or conduit 130 of FIGURE 22. The bellows 40 of the member 30 is pulled downwardly as the refrigeration compressor operates and reduces the refrigerant pressure in line 130. This causes the right arm construction 20 to rock clockwise about its respective fulcrum construction and causes the screw 98 to push an abutment flange 100, FIGURE 21, to move the shuttle 101 rightwardly gradually as the pressure in the refrigerant line 130 falls and this gradually moves the switch actuator blade 152 rightwardly until the snap blade 148 is snapped rightwardly to open the contact 150 away from the stationary contact 146 when the refrigerant line pressure 130 falls to the "cut out" pressure. This stops the refrigeration cycle by opening the line L' by again stopping the motor 142 and the compressor 132 when the pressure in line 130 has reached such low selected "cut out" pressure. This stops the refrigeration cycle when the evaporator 140 has reached the desired low temperature limit. The refrigerating system will not start again until the pressure in low pressure line 130, FIGURE 22, reaches a desired "cut in" pressure, as determined by the differential spring 111.

It is thus to be seen, that in the pressure and/or temperature regulator of FIGURES 6-8, the left arm construction 20 determines the upper pressure limit of the refrigerant line 128 and thereby also determines the high temperature of the condenser 134 at which the refrigeration system is to be stopped. The right arm construction 20 is rocked by the pressure in the bellows chamber 42 of member 30 and this will cause the right hand arm 20 to move clockwise with the vertical arm 48 moving rightward to stop the refrigeration cycle when the pressure and temperature of the evaporator 140 reaches the desired low limit, generally known as the cut out temperature limit.

In the construction shown in FIGURE 23, a single pressure and/or temperature responsive member 32 is connected by the line 36 to the low pressure line 130 of a refrigeration system or the like similar to that shown in FIGURE 22. The controller of FIGURE 23 operates a snap switch 144, which may be similar to that shown in FIGURE 6, so that the controller of FIGURE 23 stops the refrigeration cycle or other controlled system when the low pressure side or line 130 of the system reaches a selected low pressure or "cut out" limit, at which time the snap switch 144 is snapped open to break the power connection to the motor 142 and stop the motor 142 at such selected low pressure. The controller of FIGURE 23 will start the refrigeration system when the pressure in the line 130 rises to the desired "cut in" pressure.

In the embodiment of FIGURE 25, the pressure and temperature responsive member 34 may be connected to the high pressure line 128 of the refrigeration system of FIGURE 22 or the like. The arm construction 20 of FIGURE 25 has its fulcrum point on the left hand side of the actuator 45, so that the vertical arm lever 48 moves leftwardly upon the rise of pressure in the controller 34.

The abutting screw 98, abuts the lower end of the reversing lever 170, which lever is fulcrumed about the fulcrum 172. The fulcrum 172 is mounted on the rear wall 162 of the controller 26. The upper end of the reversing lever 170 pushes the end of the shuttle 101, which may be of the same general nature as shown in FIGURE 21, but of shorter length. The screw 154 moves the actuating lever 152 of snap switch 144 and opens the snap switch 144 when the pressure in the pressure and/or temperature responsive member 34 reaches the desired upper selected limit.

FIGURES 23 and 25 show how the same general construction may be used to be connected to either the low pressure side of a refrigeration and the like, as is done in FIGURE 23, or the high pressure side, as is shown in FIGURE 25.

Other details are shown concerning the construction of the pressure regulator which are more fully described in applicant's co-pending application entitled Pressure or Temperature Regulator.

Details of such parts may be learned from that application.

It is thus to be seen that an efficient and versatile arm construction has been provided for pressure and/or temperature regulators for refrigerating systems, air conditioning systems, and the like.

While the form of the invention now preferred has been disclosed as required by statute, other forms may be used, all coming within the scope of the claimed subject matter which follows.

What is claimed is:

1. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said arm fulcrum means is a groove means on the under side of said horizontal arm lever, and in which said frame fulcrum means includes a fulcrum ridge means rockingly receiving said groove means, and in which said frame fulcrum means is fixedly secured to said frame and with said groove means provide a universally mounted fulcrum means for said rocker arm.

2. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said arm fulcrum means is a groove means on the under side of said horizontal arm lever, and in which said frame fulcrum means includes a fulcrum ridge means rockingly receiving said groove means, and in which said frame fulcrum means includes frame rocking means to rock on a frame ridge means at right angle to said fulcrum ridge means.

3. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said arm fulcrum means is a groove means on the under side of said horizontal arm lever, and in which said frame fulcrum means includes a fulcrum ridge means rockingly receiving said groove means, and in which said frame fulcrum means includes a fulcrum plate means having a plate fulcrum ridge means on the upper side of said plate means, and in which said plate means has an underside outer flat portion for rocking on a frame ridge means at right angle to said plate fulcrum ridge means, and has a central downward button to extend into a frame opening dividing said frame ridge means.

4. An arm construction according to claim 3 in which there are two spaced groove means on the under side of said horizontal arm lever and there are two fulcrum plate means each with a separate plate fulcrum ridge means on the upper side of said plate means to engage said two groove means, and in which said two fulcrum plate means each has an underside flat portion for rocking on two separate frame ridge means at right angle to said fulcrum ridge means, and has a central downward button to extend into a frame opening dividing a frame ridge means.

5. An arm construction according to claim 4 in which said horizontal arm has an arm holding tongue with a free end between said two spaced groove means, and said frame has a fulcrum hook that interlocks with said holding tongue to hold said groove means and ridge means interlocked.

6. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said horizontal arm lever has a spring end receiver with rocking means engaging said horizontal arm lever, and in which said spring end receiver is a substantially horizontal rockable spring receiving plate with a downward fulcrum member engaging the top side of said horizontal arm lever.

7. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said horizontal arm lever has a spring end receiver with rocking means engaging said horizontal arm lever, and in which said spring end receiver is a substantially horizontal rockable spring receiving plate with rocking means engaging the top side of said horizontal arm lever, said plate having upward spring receiving flange means to hold a spring against horizontal displacement.

8. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said horizontal arm lever has a spring end receiver with rocking means engaging said horizontal arm lever, and in which said spring end receiver is a substantially horizontal rockable spring receiving plate with a downward fulcrum member engaging the top side of said horizontal arm lever and which plate has upward spring receiving flange means to hold a spring against horizontal displacement.

9. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said vertical arm lever has a vertical channel with an upper channel edge adjacent to the upper edge of said vertical arm, said upper channel edge receiving the lower end of an adjustable compression negating spring means.

10. An arm construction for a pressure regulator and the like comprising: an L-shaped rocker arm having a substantially horizontal arm lever and a substantially vertical arm lever rigidly secured at a rigid arm lever junction; arm fulcrum means on said arm construction adjacent said lever junction; and frame fulcrum means to be supported on a frame and rockingly engaging said arm fulcrum means, and in which said vertical arm lever has a plurality of screw receiving holes to receive abutment producing screws.

11. An arm construction for a pressure regulator and the like comprising: an L-shaped rocker arm having a substantially horizontal arm lever and a substantially vertical arm lever rigidly secured together at a rigid arm lever junction; arm fulcrum means on said arm construction adjacent said lever junction; and frame fulcrum means to be supported on a frame and rockingly engaging said arm fulcrum means, and in which said vertical arm lever has a vertical channel with an upper channel edge adjacent to the upper edge of said vertical arm, said upper channel edge being adapted to receive the lower end of a negating spring, and in which said vertical arm lever has a screw receiving hole to receive an abutment producing screw.

12. An arm construction according to claim 11 in which said vertical arm lever has another screw receiving hole to receive an abutment producing screw.

13. An arm construction for a pressure regulator and the like comprising: a spring end receiving plate with rocking means on the under side of said plate to engage the top side of a horizontal arm lever, said plate having upward spring end engaging means to hold said spring from horizontal displacement, and in which said plate has a downward flat tongue means to engage a rocker groove on the top side of said horizontal arm lever, and in which said plate has an upward flange means to receive said spring end and to prevent horizontal displacement of said spring, and in which said plate has a downward flat tongue means to engage a rocker groove on the top side of said horizontal arm lever, and in which said flat tongue means includes a zig-zag sheet metal member having a flat central attaching part attached to the lower part of said plate and a downwardly directed part with a tongue forming edge, and said upward flange means includes an upwardly directed flange of said zig-zag member which extends upwardly through an edge opening in said plate, said upward flange means also including flanges cut and bent upwardly from the edge of said plate.

14. An arm construction according to claim 13 in which said central attaching part of said zig-zag member has an opening which receives a downward tongue of said plate, said downward tongue being staked in said last-named opening.

15. An arm construction for a pressure regulator and the like comprising: upward fulcrum ridge means rockingly to receive a downward groove means on the under side of a rocker arm of said regulator; a central plate construction forming the main body of said fulcrum ridge means, said central plate construction having an under side flat portion for rocking on a frame ridge means which frame ridge means is at right angle to said upward fulcrum ridge means; an upward ridge construction on the upper side of said central plate forming an upward ridge for said fulcrum ridge means; and a central downward button on the under side of said plate construction to extend into a frame opening which divides said frame ridge means.

16. An arm construction for a pressure regulator and the like comprising: a rocker arm having a vertical arm lever, said arm having fulcrum means about which said vertical arm lever rocks; a vertical channel means on said vertical arm lever, said channel having an upper channel edge adapted to receive the lower end of a negating spring.

17. An arm construction according to claim 16 in which said vertical arm lever has a screw receiving hole to receive an abutment producing screw.

18. An arm construction according to claim 17 in which said vertical arm lever has another screw receiving hole to receive an abutment producing screw, said screw receiving holes being on opposite sides of said vertical channel means.

19. An arm construction for a pressure regulator and the like comprising: a substantially horizontal arm lever having opposite sides and ends; a substantially vertical arm lever having opposite sides and ends and extending upwardly from said horizontal arm lever; a rigid arm lever junction means rigidly joining adjacent ends of said arm levers; fulcrum means on the under side of said horizontal arm lever; and two side braces respectively joined to opposite sides of said arm levers.

20. An arm construction for a pressure regulator and the like comprising: a substantially horizontal arm lever having opposite sides and ends; a substantially vertical arm lever having opposite sides and ends; a rigid arm lever junction means rigidly joining adjacent ends of said arm levers; and two side braces respectively joined to opposite sides of said arm levers, and with said vertical arm lever having a vertical channel with a top edge adapted to receive the lower end of a negating spring, and having a plurality of screw receiving holes to receive screws to engage abutment flanges of a shuttle member.

21. An arm construction for a pressure regulator and the like comprising: a substantially horizontal arm lever having opposite sides and ends; a substantially vertical arm lever having opposite sides and ends; a rigid arm lever junction means rigidly joining adjacent ends of said arm levers; and two side braces respectively joined to opposite sides of said arm levers, and in which said horizontal lever has a downwardly slanting tongue which has an upwardly bent free end to engage a frame fulcrum hook, said free end having two ears engaging the sides of said fulcrum hook, said horizontal lever also having a rocker groove with a relatively deeply curved central part and with relatively shallower sharp bottomed rocker groove means at its end to receive the ends of a downward lip of a compression spring receiver.

References Cited
UNITED STATES PATENTS

| | | | |
|---|---|---|---|
| 1,885,783 | 11/1932 | Summers | 200—140 XR |
| 2,259,265 | 10/1941 | Pearce | 200—83 |
| 2,355,872 | 8/1944 | Kronmiller | 200—83 |
| 2,387,793 | 10/1945 | Holmes | 236—99 |
| 2,476,784 | 7/1949 | Wahlstrom | 74—97 XR |
| 2,919,654 | 1/1960 | Korte | 74—559 XR |

HALL C. COE, *Primary Examiner.*

U.S. Cl. X.R.

74—97; 200—140